United States Patent [19]

Fukushima

[11] Patent Number: 4,569,668
[45] Date of Patent: Feb. 11, 1986

[54] DAMPER DISC

[75] Inventor: Hirotaka Fukushima, Neyagawa, Japan

[73] Assignee: Kabushiki Kaisha Daikin Seisakusho, Neyagawa, Japan

[21] Appl. No.: 666,537

[22] Filed: Oct. 30, 1984

[30] Foreign Application Priority Data

Oct. 31, 1983 [JP] Japan .................................. 58-205297

[51] Int. Cl.[4] ................................................ F16D 3/14
[52] U.S. Cl. ................................... 464/68; 192/106.2; 464/63
[58] Field of Search ............... 192/30 V, 106.1, 106.2; 464/63, 66, 68, 81, 180

[56] References Cited

U.S. PATENT DOCUMENTS 2,065,601 12/1936 Meyer .............................. 192/106.2
3,259,222 7/1966 Jania ............................ 192/106.2 X
4,430,064 2/1984 Lamarche .................... 192/106.2 X
4,484,898 11/1984 Kohno ............................... 464/68 X
4,493,674 1/1985 Tamura et al. .............. 192/106.2 X

FOREIGN PATENT DOCUMENTS 2256582 5/1973 Fed. Rep. of Germany ... 192/106.2

Primary Examiner—Stuart S. Levy
Assistant Examiner—Daniel P. Stodola
Attorney, Agent, or Firm—Armstrong, Nikaido, Marmelstein & Kubovcik

[57] ABSTRACT

A damper disc providing a sub-damper comprising a torsion spring compressively provided along a circumferential line at an outer peripheral portion of a flange of a hub, a circular arc weight concentrically and freely rotatably supported by the flange and an end portion thereof being pressed against an end face of the torsion spring, and a friction torque generating part provided between the flange and the weight.

3 Claims, 7 Drawing Figures

DAMPER DISC

BACKGROUND OF THE INVENTION

This invention relates to a damper disc usable as a clutch disc assembled in a clutch for an automobile, an agricultural machine, a construction machine etc., or usable as a damper for marine purpose.

In an automobile equipped with a manual transmission, for example, a countermeasure has conventionally been taken against abnormal sound emitted from a driving system at the time of acceleration or floating by reducing the torsional rigidity of the clutch disc. However, there exists an upper limit for the maximum torsion angle due to the structure of the clutch disc. Thus, a lower limit is produced in torsional rigidity. Further, too much weakening of the torsional rigidity of clutch would badly effect transient vibration from abrupt acceleration from engine knocking, and the like. Conventionally, abnormal sound at the time of acceleration and floating has not been avoided at the clutch disc due to that problem together with the above-mentioned structural limitation. Moreover, it is well known that a dynamic damper can be assembled in a propeller shaft etc. for the purpose of preventing the abnormal sound, but, in a clutch, there are disadvantages of an increase in number of components, an increase in cost and more complicated assembly.

An object of this invention is to prevent abnormal sound emitted from a drive-transmission system in an automobile, a ship etc.

In order to accomplish the above object of this invention, a sub-damper is provided, which comprises a torsion spring compressively provided along a circumferential line at an outer peripheral portion of a flange of a hub, a circular arc weight concentrically and freely rotatably supported by the flange with an end oportion pressed against an end face of a torsion spring, and a friction torque generating part provided between the flange and the weight.

DETAILED DESCRIPTION OF THE INVENTION

Figure 1:
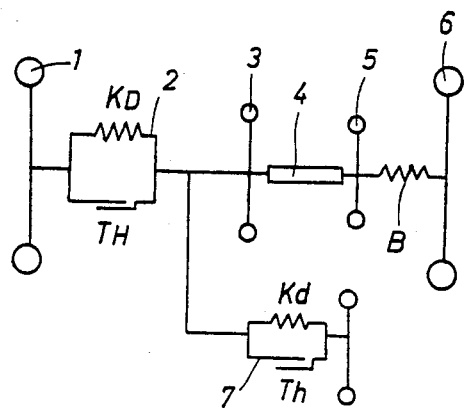
FIG. 1 is a skeleton diagram of a drive-transmission system of an automobile.
Figure 6:
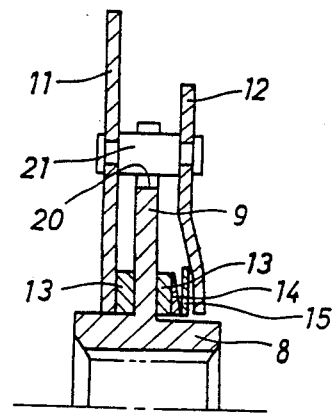
FIG. 6 is a partial sectional view taken on a line VI—VI of FIG. 3.

This invention will be described as applied to a damper disc for use in a clutch disc for an automobile. First of all, in FIG. 1 showing the skeleton diagram of the drive-transmission system of automobile, 1 is an engine and 2 is a clutch disc included in a clutch. The clutch disc 2 connects to a transmission 3, the transmission 3 in turn connects through a propeller shaft 4 and a differential 5 to a drive shaft B, and the drive shaft B drives a vehicle inertia 6. In the figure, a spring (with characteristic Kd) and a friction torque generating part (with characteristic Th) are provided in the clutch disc 2 so as to absorb torsional vibration between the engine 1 and the transmission 3.

Hereupon, it can be considered that components included between a spline hub (described later) of the clutch disc 2 and a gear of the differential 5 form one inertia system of drive-transmission with respect to vibration of the drive-transmission system concerning generation of abnormal sound at the time of acceleration and floating, so that a vibration damping effect, i.e. abnormal sound preventive effect can be obtained even when a dynamic damper is attached to said spline hub. For this reason, in this invention a dynamic damper 7 (sub-damper) having the spring (with characteristic Kd) and the friction torque generating part (with characteristic Th) are assembled in the spline hub of the clutch disc 2.

Figure 2:
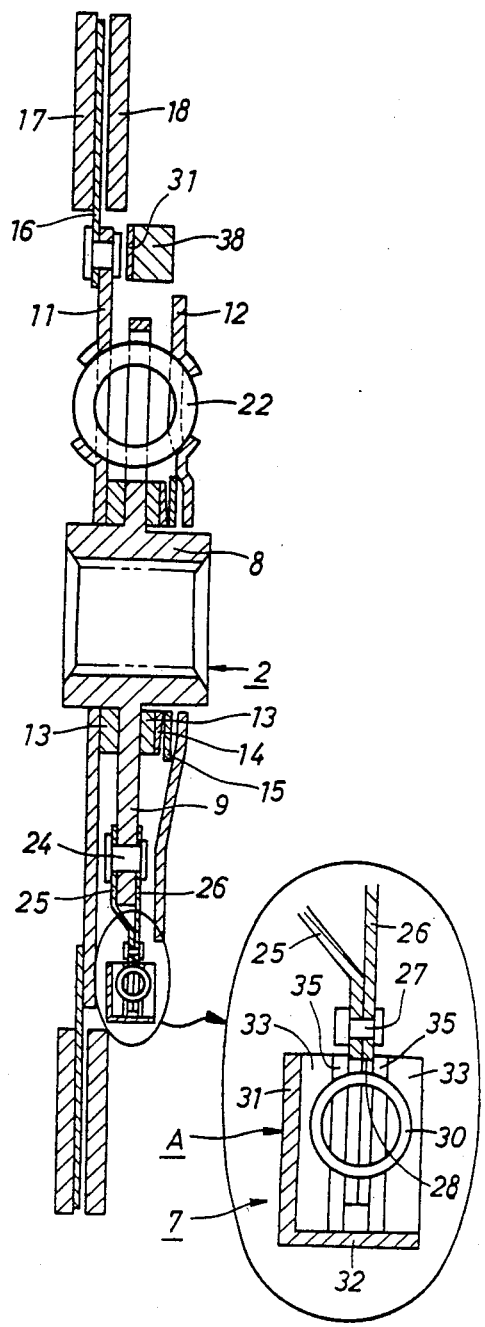
FIG. 2 is a vertical sectional view of the damper disc (clutch disc) according to this invention.

Mechanism of the clutch disc 2 will be described hereunder. In FIG. 2 showing the vertical sectional view, a spline hub 8 of the clutch disc 2 spline fits onto a horizontal transmission input shaft (not shown). The spline hub 8 has on its outer periphery an integral annular flange 9, and an annular clutch plate 11 and a retaining plate 12 (a pair of side plates) fit onto the hub 8 freely rotatably at hub outer peripheries on flange 9. A frictional material 13 is interposed between side surfaces of the flange 9 and the clutch plate 11, and friction materials 13, 14 and a cone spring 15 are interposed between side surfaces of the flange 9 and the retaining plate 12. A pair of friction facing 17, 18 is secured through a cushioning plate 16 to an outer peripheral portion of the clutch plate 11, as is generally known.

Figure 3:
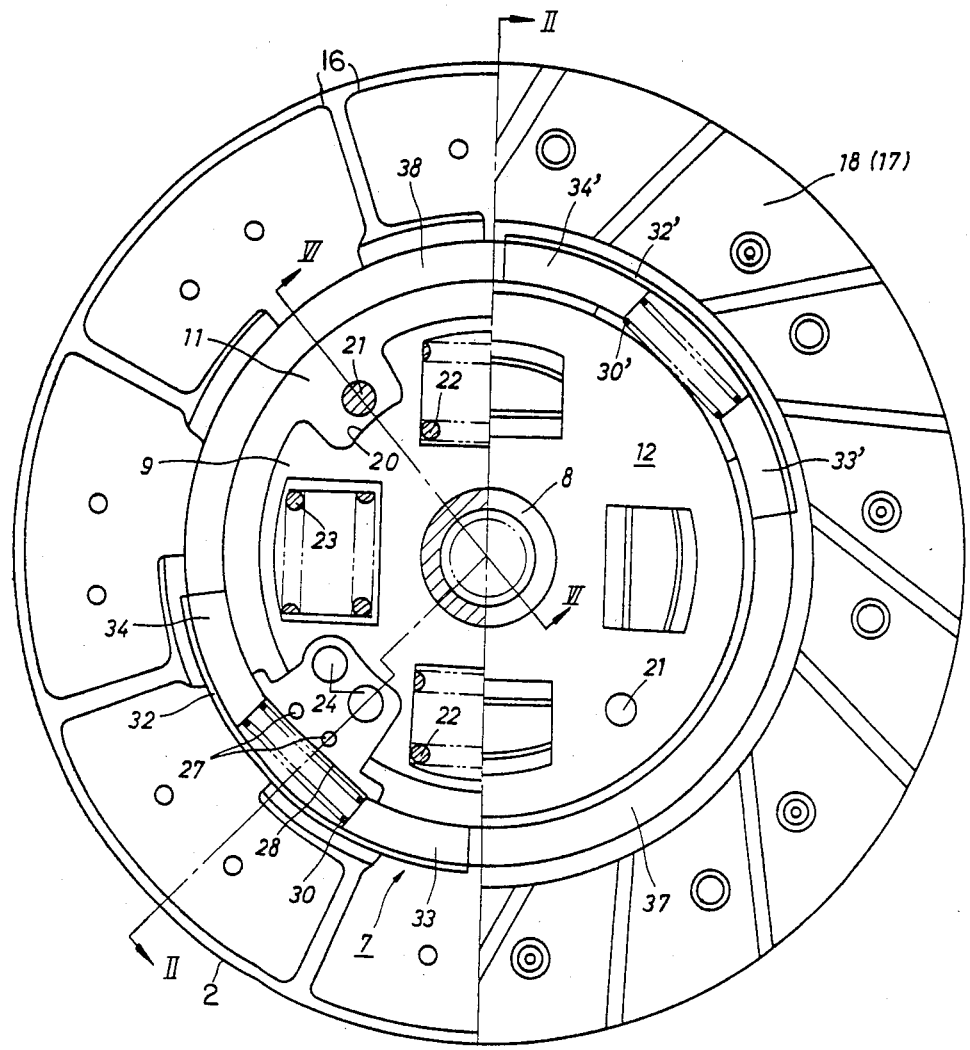
FIG. 3 is a side view of the same.

In FIG. 3 showing the side view, a stop pin 21 passing through a notch 20 of the flange 9 integrally connects the both clutch and retaining plates 11, 12 and at the same time defines a relative rotation limit of the both plates 11, 12 against the flange 9 (i.e. hub 8). The flange 9 and the both clutch and retaining plates 11, 12 are elastically interconnected to each other through two kinds of torsion springs 22, 23 (each two) interposed in facing window holes.

Figure 4:
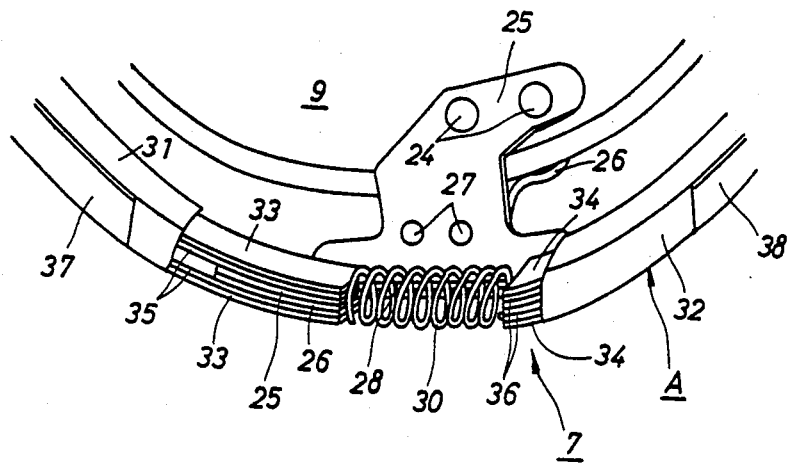
FIG. 4 is a schematic oblique view of a sub-damper.
Figure 5:
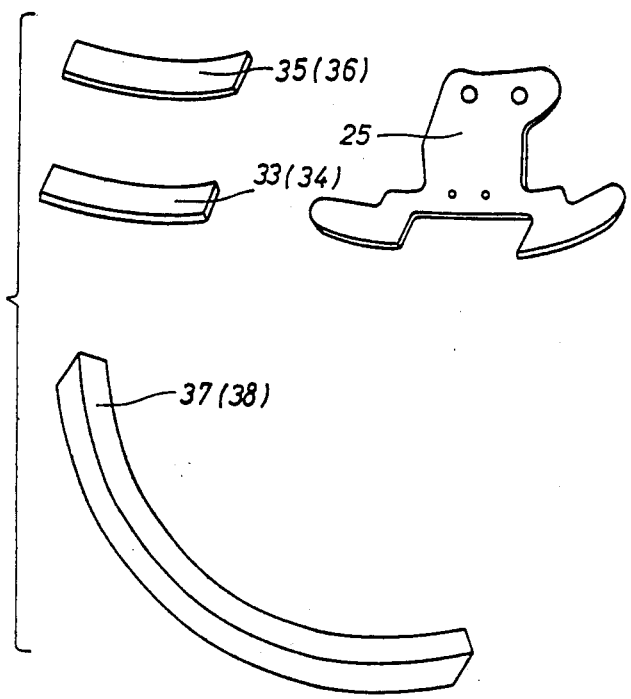
FIG. 5 is a schematic exploded oblique view of the sub-damper.

The sub-damper 7 according to this invention will be described hereunder. In FIG. 2, a pair of sub-plates 25, 26 are secured to outer peripheries of the flange 9 by means of a rivet 24, and the both sub-plates 25, 26 are put together by means of a rivet 27 (enlarged view) radially outside of the flange 9. A torsion or compression spring 30 is interposed in a notch 28 provided on the sub-plates 25, 26. FIG. 4 is the schematic oblique view of the sub-damper 7 viewing from the clutch plate side with the clutch plate taken out, and in this figure an annular retainer 31 having a larger diameter than the flange 9 and parallel to the flange 9 has an integral flange 32 perpendicular to its body in the vicinity of the sub-plates 25, 26. Two pairs of circular arc spacers 33, 34 having the same curvature as the retainer 31 are secured to circumferential positions of the retainer 31 and the flange 32 holding the notch 28, and circular arc friction materials 35, 36 are further secured to facing side surfaces of the spacer 33, 34. The friction materials 35, 36 hold the sub-plates 25, 26 from both sides and freely rotatably support an aggregate A comprising the retainer 31, the spacers 33, 34, the friction materials 35, 36 and a weight described later to the sub-plates 25, 26. Circumferential one ends of the spacers 33, 34 and the friction materials 35, 36 are pressed against an end face of the torsion spring 30.

A pair of circular arc weights 37, 38 are secured to the retainer 31 contiguously to circumferential outer ends of the spacers 33, 34 and the friction materials 35, 36 respectively. A circumferential clearance is provided between the weights 37, 38 and the sub-plates 25, 26. The same spacers and friction materials are mentioned above are secured to said annular retainer contiguously to circumferential ends (FIG. 3) of the weights at the side not shown in FIG. 4, said spacers and friction materials hold a pair of sub-plates secured to the flange of the hub 8 from both sides and are pressed against an end face of a torsion spring 30' interposed in notches of said sub-plates.

Figure 7:
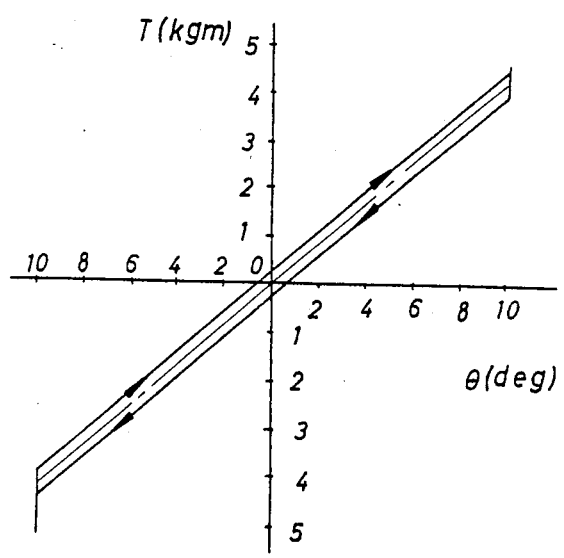
FIG. 7 is a graph showing a relation between torque and torsion angle of the sub-damper.

Operation of the damper disc is now described. Referring to FIG. 2, when a pressure plate (not shown) of the clutch presses a flywheel (not shown) of the engine against the friction facings 17, 18, torque of the engine is transmitted through the cushioning plate 16 to both the clutch and retaining plates 11, 12 and further from the both plates 11, 12 through the torsion springs 22, 23 and the friction materials 13, 14 to the spline hub 8, and is supplied, from a transmission input shaft connected to the hub 8 through the above-mentioned drive-transmission system, to a drive shaft. When a torsional vibration is generated in the drive-transmission system due to a torque-fluctuation etc. in engine, the weight 38 rotatively moves corresponding to such vibration, relatively to the sub-plates 25, 26 (i.e. the flange 9) through the springs 30, 30' in a direction to damp the vibration of the drive-transmission system. Friction torque is generated between the aggregate A and the sub-plates 25, 26 during such vibration. From the relationship between torque T of the sub-damper 7 and a torsion angle $\theta$ (a relative rotating angle of the aggregate A to the flange 9), a damper characteristic curve is obtainable, as shown in FIG. 7.

Effect of Invention

According to this invention, the rotation speed at which a resonance is produced can be reduced to a level lower than a practical speed range through means of (a) an inertia added by the sub-damper (mainly due to an inertia of the weight), (b) a friction torque produced in the sub-damper and (c) a cushioning effect of the torsion spring in the sub-damper, the abnormal sound from the drive-transmission system can be reduced by reducing the above-mentioned resonance rotation speed and the same effect, as reducing the torsion rigidity of the clutch disc, can be produced.

Another Embodiment

In embodying the present invention, the construction of clutch disc body can be modified freely. Further, it is not necessary to provide the sub-plate in order to assemble the sub-damper it is possible to have the flange of hub directly support the sub-damper. The quantity of the weight and torsion spring for the sub-damper may be three or more, respectively. Moreover, this invention may be applied to a clutch disc for the agricultural or construction machine, or to a damper for marine use.

What is claimed is:

1. A dynamic damper for dampening vibrations in a friction clutch having a clutch input plate fitted on a splined output hub having a radially extending flange with a peripheral outer edge extending circumferentially around said hub and torsion springs between said plate and said hub flange for transmitting input torque from said plate to said hub flange and said output hub, said dynamic damper comprising a plurality of equally and circumferentially spaced notches extending outwardly from and circumferentially along the periphery of said hub flange, a compression spring in each of said notches and extending circumferentially therein, an arcuate weight outwardly from and extending circumferentially along the periphery of said hub flange intermediate the ends of each pair of adjacent compression springs and friction means at the ends of said compression springs intermediate said compression spring end and an end of the intermediate arcuate weight, said friction means abutting said end of said compression spring and said end of said arcuate weight and allowing said arcuate weights to move circumferentially about said hub and compress said compression springs for dynamically dampening vibration when the input torque to said input plate, said hub flange and said output hub is abruptly changed.

2. A dynamic damper, as recited in claim 1, in which said notches are formed in plates equally and circumferentially spaced around and fixed to the periphery of said hub flange.

3. A dynamic damper, as recited in claim 1, in which said arcuate weights and said friction means are fixed to a retainer extending circumferentially around and spaced radially outwardly from the periphery of said hub flange.

* * * * *